United States Patent [19]

Matsuzaki

[11] Patent Number: 4,843,409

[45] Date of Patent: Jun. 27, 1989

[54] THERMAL TRANSFER PRINTER

[75] Inventor: Masatoshi Matsuzaki, Kobe, Japan

[73] Assignee: Konishiroku Photo Industry Co., Ltd., Tokyo, Japan

[21] Appl. No.: 75,646

[22] Filed: Jul. 20, 1987

[30] Foreign Application Priority Data

Jul. 22, 1986 [JP] Japan ............................ 61-111516[U]

[51] Int. Cl.[4] ............................................ G01D 15/10

[52] U.S. Cl. ............................................... 346/76 PH

[58] Field of Search ............ 346/76 PH; 219/216 PH; 364/518, 519; 400/120

[56] References Cited

U.S. PATENT DOCUMENTS 4,405,929 9/1983 Sugano ......................... 219/216 PH 4,623,903 11/1986 Hashimoto ............... 219/216 PH X

*Primary Examiner*—E. A. Goldberg
*Assistant Examiner*—M. M. Lateef
*Attorney, Agent, or Firm*—Finnegan, Henderson, Farabow, Garrett and Dunner

[57] ABSTRACT

A thermal transfer printer capable of variably setting a printing density and a printing speed, includes a test printing mechanism for performing test printing by changing combinations of the printing density and the printing speed. The test printing mechanism includes a memory for storing a plurality of combinations of the printing density and the printing speed, and a CPU for controlling a rotational speed of a carriage motor and an application voltage of a printing head on the basis of the plurality of combinations stored in the memory.

9 Claims, 3 Drawing Sheets

FIG. 3

```
Ver.1.0 Test Print

60cps - Low
 !"#$%&'()*+,-./0123456789:;<=>?ABCDEFGHIJKLMNOPQRSTUVWXYZ
!"#$%&'()*+,-./0123456789:;<=>?ABCDEFGHIJKLMNOPQRSTUVWXYZ[

60cps - Mid
 !"#$%&'()*+,-./0123456789:;<=>?ABCDEFGHIJKLMNOPQRSTUVWXYZ
!"#$%&'()*+,-./0123456789:;<=>?ABCDEFGHIJKLMNOPQRSTUVWXYZ[

60CPS - Hi
 !"#$%&'()*+,-./0123456789:;<=>?ABCDEFGHIJKLMNOPQRSTUVWXYZ
!"#$%&'()*+,-./0123456789:;<=>?ABCDEFGHIJKLMNOPQRSTUVWXYZ[

40cps - Low
 !"#$%&'()*+,-./0123456789:;<=>?ABCDEFGHIJKLMNOPQRSTUVWXYZ
!"#$%&'()*+,-./0123456789:;<=>?ABCDEFGHIJKLMNOPQRSTUVWXYZ[

40cps - Mid
 !"#$%&'()*+,-./0123456789:;<=>?ABCDEFGHIJKLMNOPQRSTUVWXYZ
!"#$%&'()*+,-./0123456789:;<=>?ABCDEFGHIJKLMNOPQRSTUVWXYZ[

40cps - Hi
 !"#$%&'()*+,-./0123456789:;<=>?ABCDEFGHIJKLMNOPQRSTUVWXYZ
!"#$%&'()*+,-./0123456789:;<=>?ABCDEFGHIJKLMNOPQRSTUVWXYZ[

20cps - Low
 !"#$%&'()*+,-./0123456789:;<=>?ABCDEFGHIJKLMNOPQRSTUVWXYZ
!"#$%&'()*+,-./0123456789:;<=>?ABCDEFGHIJKLMNOPQRSTUVWXYZ[

20cps - Mid
 !"#$%&'()*+,-./0123456789:;<=>?ABCDEFGHIJKLMNOPQRSTUVWXYZ
!"#$%&'()*+,-./0123456789:;<=>?ABCDEFGHIJKLMNOPQRSTUVWXYZ[

20cps - Hi
 !"#$%&'()*+,-./0123456789:;<=>?ABCDEFGHIJKLMNOPQRSTUVWXYZ
!"#$%&'()*+,-./0123456789:;<=>?ABCDEFGHIJKLMNOPQRSTUVWXYZ[
```

THERMAL TRANSFER PRINTER

BACKGROUND OF THE INVENTION

1. Field of the Invention

The present invention relates to a thermal transfer printer having a test printing function.

2. Description of the Prior Art

Thermal transfer printers have an advantage in printing on normal paper and have been recently popular. In a printer of this type, a thermal head having dot-like heating elements is moved in a printing direction (from left to right), and voltages are selectively applied to the heating elements. An ink on an ink ribbon is melted by heat from the heating elements and information is transferred onto normal paper.

Printing quality varies depending on the degree of smoothness of the surfaces of normal paper sheets (recording sheets) subjected to printing. For example, if the surface of a recording sheet is not so smooth, an ink is not satisfactorily transferred to the sheet, thus degrading printing quality. For this reason, in a conventional thermal transfer printer as described in "OKIMATE 20 Printer Hand book" (1984, OKIDATA), a printing density and a printing speed can be independently changed to perform printing, and test printing can be performed to adjust the printing conditions during test printing so as to match with paper quality. For example, if quality of a print is poor during test printing, a head voltage and hence the printing density is increased or a printing speed is decreased to improve printing quality. Upon completion of test printing, printing is initiated according to the adjusted printing density and speed.

Adjustment during test printing must be performed by changing combinations of printing density and speed and is time-consuming and cumbersome. Unless an operator is accustomed to adjustments to some extent, desired printing conditions cannot be set. When the operator is not accustomed to adjustments, he or she often may not even know that the printing density and speed are adjustable. As a result, the proper printing conditions are not often determined.

SUMMARY OF THE INVENTION

The present invention has been made in consideration of the above situation, and has as its object to allow an operator to easily set desired printing conditions according to quality of a recording sheet. For this purpose, there is provided a test printing means for performing test printing by changing combinations of printing density and speed. Therefore, the operator can decide optimal printing conditions by observing the test printing results.

BRIEF DESCRIPTION OF THE DRAWINGS

FIG. 3 is a view showing printing samples printed by the thermal printer shown in FIG. 1.

DETAILED DESCRIPTION OF THE PREFERRED EMBODIMENTS

The present invention will be described with reference to the accompanying drawings.

Figure 1:
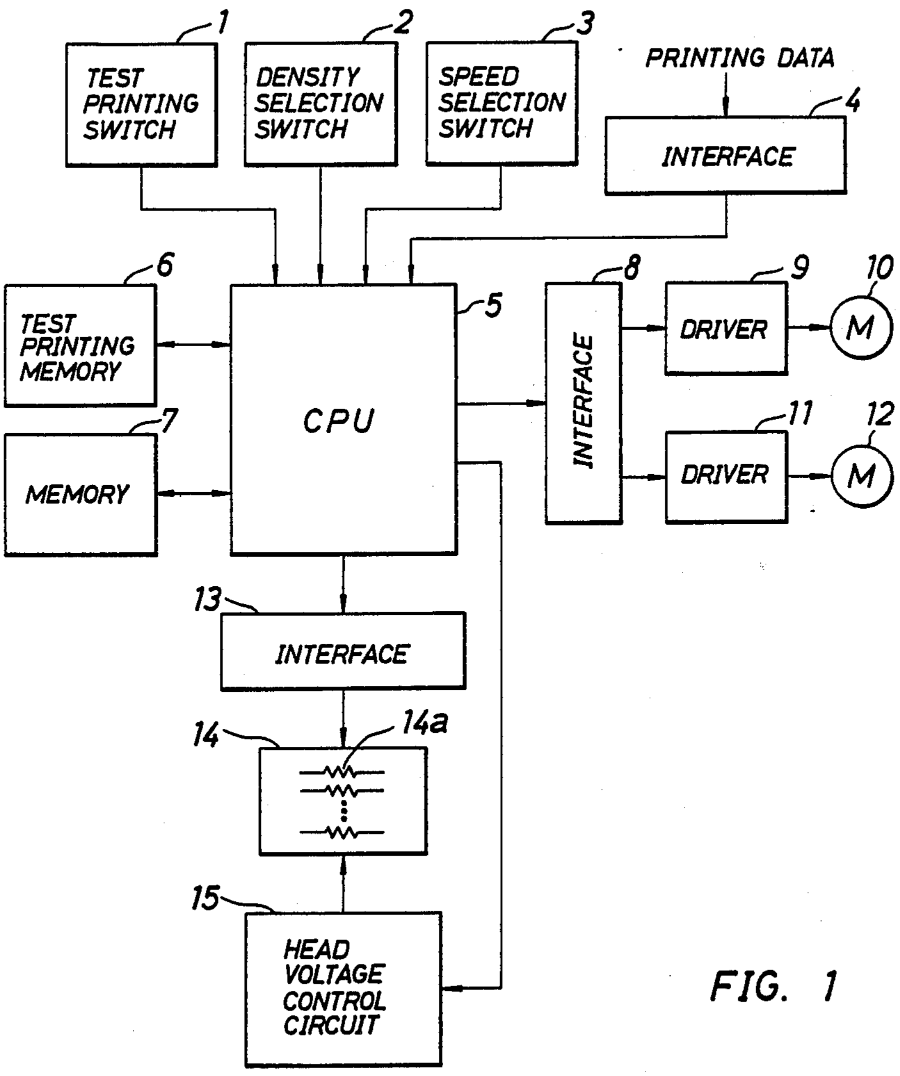
FIG. 1 is a block diagram of a thermal printer according to an embodiment of the present invention.

FIG. 1 is a block diagram of a thermal printer according to an embodiment of the present invention. Reference numeral 1 denotes a test printing switch for initiating test printing; 2, a density selection switch for selecting a printing density in three steps (high, middle, and low); 3, a speed selection switch for selecting a printing speed of a thermal head in three steps (high, middle, and low); 4, an interface for inputting external printing data; 5, a CPU for processing the external printing data and controlling the components of the thermal printer; 6, a test printing memory for storing a test printing program; 7, a memory including a character font section and a buffer memory section; 8, an interface; 9, a driver for driving a carriage motor 10; 11, a driver for driving a recording paper feed motor 12; 13, an interface; 14, a thermal head in which heating elements 14*a* are embedded; and 15, a head voltage control circuit for controlling a head voltage selectively applied to the heating elements 14*a*.

At first, normal printing will be described.

A power switch (not shown) of the thermal printer is turned on and the density selection switch 2 and the speed selection switch 3 are set at any positions so as to set arbitrary printing conditions. When printing data is input from an external device to the CPU 5 through the interface 4, the CPU 5 sequentially reads out the printing data and generates dot matrix data in units of characters with reference to the character font section arranged in the memory 7. The dot matrix data is temporarily stored in the buffer memory section and is then transferred to the thermal head 14 through the interface 13. The heating elements 14*a* in the thermal head 14 are selected in accordance with the input signal. Head voltages corresponding to the printing density set by the density selection switch 2 are applied from the head voltage control circuit 15 to the selected heating elements 14*a*. In synchronism with the voltage application, an instruction is sent from the CPU 5 to the driver 9 through the interface 8, and the carriage motor 10 is driven to move the thermal head 14 in the printing direction. The carriage motor 10 comprises a stepping motor. The printing data is sent to the thermal head 14 in synchronism with stepping operation of the motor 10, and the predetermined heating elements 14*a* are heated to perform printing. The printing speed is determined by a frequency of pulses for driving the stepping motor and is set by the speed selection switch 3. When on-line printing is completed, the recording paper feed motor 12 is driven to perform line feed. Thereafter, the above operation is repeated.

Figure 2:
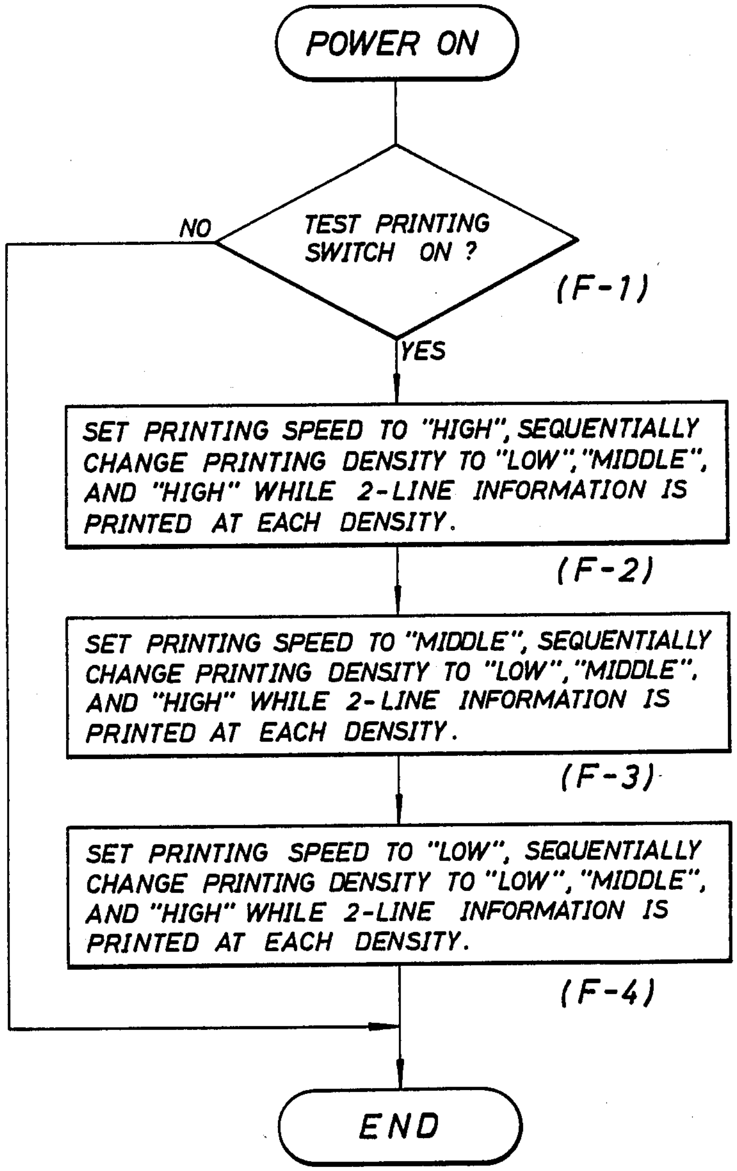
FIG. 2 is a flow chart for explaining test printing in the thermal printer shown in FIG. 1.

Test printing will be described with reference to a flow chart in FIG. 2.

A recording sheet having the same quality as the one subjected to actual printing is loaded in the thermal printer. The power switch of the thermal printer is turned on and the test printing switch 1 is turned on (F-1). The printer initiates test printing. Test printing is performed according to the program written in the test printing memory 6 by changing combinations of printing density and speed in a predetermined order.

More specifically, the printing speed is set to "high" (e.g., 60 cps) and the printing density is set to "low". The head voltages corresponding to the "low" printing density are selectively applied from the head voltage control circuit 15 to the heating elements 14*a*. Drive pulses having a pulse frequency corresponding to the "high" printing speed are applied to the carriage motor 10. Two-line test data (letters A, B, C, D, . . . ) is printed out; another two-line test data is printed out at the "high" printing speed and the "middle" printing density; and another two-line data is printed out at the "high" printing speed and the "high" printing density (F-2). Subsequently, the printing speed is set to "middle" (e.g., 40 cps) and the printing density is changed in an order of "low", "middle", and "high" (F-3) to print out two-line test data each. Finally, the printing speed is set to "low" (e.g., 20 cps), and the printing density is changed in an order of "low", "middle", and "high" to print out two-line test data each (F-4).

The operator selects a satisfactory one of the test printing results and sets the printing density and speed selection switches 2 and 3 so as to obtain the printing conditions of the satisfactory test printing result. Thereafter, actual printing is performed. Therefore, desired printing quality can be easily obtained according to quality of the recording sheet. For example, if a sheet to be printed has high smoothness and good printing quality can be obtained at the "high" printing speed and the "low" printing density as a result of test printing, the operator sets the "high" printing speed and "low" printing density. With this combination of printing speed and printing density, information can be printed at a maximum printing speed. If smoothness of the printing sheet is slightly degraded, printing quality is naturally degraded at the "high" printing speed. Assume that satisfactory printing quality is obtained at the "middle" printing speed. In this case, if printing quality is marginally satisfactory even at the "high" printing speed after the operator checks the test printing results, the "high" printing speed can be set and the printing density is set to, e.g., "high" if the printing speed has a priority over printing quality. However, if printing quality has a priority over the printing speed, the "middle" printing speed is set, and the printing density is also set to "middle". If smoothness of the recording sheet is further degraded and satisfactory quality is obtained only at the "low" printing speed, the printing speed is set to "low", and the printing density is set to "high" so as to obtain satisfactory printing quality.

In the above embodiment, test printing is performed with all combinations (nine) of printing densities and printing speeds. However, the number of combinations is not limited to nine, but can be limited to three. Alternatively, both the nine combinations and the three combinations may be programmed, and the user can select one of these two combination groups. In other words, a plurality of combination groups may be programmed. Each combination group consists of different combinations of printing speed and printing density. The user can select one of the combination groups.

According to the present invention as described above, the test printing means is arranged to perform test printing by changing combinations of printing densities and printing speeds. The operator can select the satisfactory printing conditions by observing the test printing results. Therefore, the desired conditions can be easily set according to quality of recording sheets.

In the above embodiment, an alphanumeric test pattern (FIG. 3) is used. In addition, it is convenient to use graphic patterns used in graphs and drawings. In general, since a graphic pattern has a larger area than an alphanumeric character, good printing quality of the graphic pattern is not necessarily obtained at printing density and speed which provide good printing quality for the alphanumeric character. In order to prevent such an inconvenience, test patterns as combinations of patterns such as bar graphs, dots having different densities, vertical lines, horizontal lines, and diagonal lines may be stored in a memory to allow the operator to select one of the alphanumeric character and graphic patterns. In graphic pattern test printing, the combinations of printing densities and printing speeds are changed and the patterns are printed under different printing conditions. The operator can thus select the satisfactory one of the test printing results.

The present invention is also applicable to a color printer which has recently become popular. Color printers include a color printer for printing information with a few colors without gray scale levels, and a color printer for printing information with 16 to 64 gray scale levels. In either case, all or some possible colors subjected to printing can be used to perform test printing. Therefore, the printing density and speed which satisfactorily match with the quality of a printing sheet and the purpose of printing can be easily selected.

The color printers here are not only color printers for performing only color printing but also color printers for detecting a color or monochromatic ribbon and performing either full-color or monochromatic printing.

What is claimed is:

1. A print testing control apparatus for the thermal transfer printer comprising: print density changing means for changing printing density of the thermal transfer printer, speed changing means for changing printing speed of the thermal transfer printer, and control means for controlling said print density changing means and said speed changing means to perform test printing by changing combinations of the printing density and the printing speed.

2. An apparatus according to claim 1, wherein said control means comprises memory means for storing a plurality of combinations of the printing density and the printing speed, and means for controlling a rotational speed of a carriage motor and an application voltage of a printing head on the basis of the plurality of combinations stored in said memory means.

3. An apparatus according to claim 1, wherein said control means comprises memory means for storing a plurality of combination groups each consisting of different combinations of the printing density and the printing speed, selecting means for selecting one of the combination groups stored in said memory means, and means for controlling a rotational speed of a carriage motor and an application voltage of a printing head on the basis of the combination group selected by said selecting means.

4. An apparatus according to claim 1, wherein said control means comprises memory means for storing a plurality of test patterns and selecting means for selecting one of the test patterns stored in said memory means, the test pattern selected by said selecting means being subjected to test printing.

5. An apparatus according to claim 4, wherein the test patterns are alphanumeric and graphic patterns.

6. An apparatus according to claim 1, wherein said thermal printer comprises a color thermal printer which performs test printing in all or some possible colors subjected to printing.

7. A print testing control apparatus for a thermal transfer printer, the printer including a thermal transfer head having a plurality of heating elements and a power supply to supply power to the heating elements, the heating elements being heated thereby to melt an ink on an ink ribbon to transfer the ink to a paper, the apparatus comprising:

speed changing means for changing the relative speed of the thermal head and the paper;

power level changing means for changing the power level supplied to the heating elements;

memory means for storing a plurality of combinations of power levels and printing speeds; and control means, responsive to each of said plurality of combinations stored in said memory means, for causing said speed changing means to change the relative speed of the thermal transfer head paper and to cause said power level changing means to change the power level supplied to the heating elements.

8. A print testing control apparatus as recited in claim 7, further including selecting means for selecting a desired one of the plurality of combinations stored in said memory means, the selected combination being input to said control means.

9. A print testing control apparatus as recited in claim 8, wherein said memory means includes a program that automatically selects desired ones of said combinations of power levels and printing speeds in a predermined order and inputs said combinations in said predetermined order into said control means.

* * * * *